(12) United States Patent
Bocka et al.

(10) Patent No.: US 7,049,727 B2
(45) Date of Patent: May 23, 2006

(54) INTEGRATED BRUSH-HOLDER RETENTION SYSTEM

(75) Inventors: Ralf Bocka, Musberg (DE); Joseph Z. Wascow, Mundelein, IL (US)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/990,571

(22) Filed: Nov. 17, 2004

(65) Prior Publication Data

US 2005/0156477 A1 Jul. 21, 2005

Related U.S. Application Data

(60) Provisional application No. 60/537,466, filed on Jan. 16, 2004.

(51) Int. Cl.
*H02K 13/00* (2006.01)

(52) U.S. Cl. .................................. 310/239
(58) Field of Classification Search ......... 310/239–247
See application file for complete search history.

(56) References Cited

U.S. PATENT DOCUMENTS

| | | |
|---|---|---|
| 3,784,856 A | 1/1974 | Preston |
| 5,793,141 A | 8/1998 | Simonsen et al. |
| 6,294,857 B1 | 9/2001 | Nakane |
| 6,394,191 B1 * | 5/2002 | Nakane ........................ 173/217 |
| 6,608,423 B1 * | 8/2003 | Tam ............................ 310/239 |

FOREIGN PATENT DOCUMENTS

| | | |
|---|---|---|
| GB | 2178248 | 2/1987 |
| WO | WO 03/107517 | 12/2003 |

* cited by examiner

*Primary Examiner*—Thanh Lam
(74) *Attorney, Agent, or Firm*—Greer, Burns & Crain, Ltd.

(57) ABSTRACT

A brush-holder system for an electric motor which is the type which has a rotating commutator that is journaled in a first motor housing portion, the assembly includes a second motor housing portion configured to be matingly connected to the first motor housing portion and having at least one brush holding pocket therein. The pocket is formed by a structure of the second motor housing portion which defines a support surface on one side thereof and a bridge portion on an opposite side thereof. The system further includes an elongated brush having first and second ends, wherein the first end is configured to be coupled to a biasing member and the second end is configured to contact the motor commutator, and at least one removable brush-holder having a first open end configured to receive the brush therein and to fit in the pocket, and a second open end enabling the brush to extend outwardly therefrom to contact the motor commutator. The system also includes a biasing member coupled to the brush, and an end cap coupled to the first open end and configured to be in abutment with the biasing member to bias the brush toward the motor commutator.

14 Claims, 10 Drawing Sheets

INTEGRATED BRUSH-HOLDER RETENTION SYSTEM

This application claims the benefit of Provisional Application No. 60/537,466, filed Jan. 16, 2004.

BACKGROUND OF THE INVENTION

The present invention generally relates to electric motors and more particularly to brush-holder systems for electric motors.

Electric motors that are used in power hand tools as well as other applications typically use brushes to provide electric interconnection with a motor commutator. As is well known in the motor art, the brushes that are used in electric motors are expendable items and must be periodically replaced over the lifetime of a motor that uses them. Motors that are used to power hand tools such as electric drills, saws and the like necessarily have a system for holding brushes that are used in the motors. Because motor brushes have a useful life that is much shorter than that of the tools in which they are used, it is often necessary to periodically replace the brushes that are worn out, which is usually much less costly to a user than replacing the entire tool.

While there have been many different designs of motors and their brush-holder systems, it was common for past systems to have brushes that were carried by brush-holders assembled in a motor housing that were secured with rubber pads, screws, end caps and the like. While some designs were more user friendly than others in that the brushes could be more easily replaced, many prior art configurations were not as convenient and adaptable to the periodic maintenance of replacing the motor brushes that were necessary to the operation of the motors.

While prior art designs utilized brush-holders that were often mounted in the motor end cap, for example, this type of design offered some advantages over prior designs in terms of the ease of replacement of the brushes. However, it was found that power hand tools that had brushes mounted in the end caps often experienced uneven performance because such power hand tools are susceptible to being dropped or shocked in one way or another. This occasionally resulted in some dysfunction or reduced performance because the force of impact from whatever source was imparted to the brush-holder assembly or the brushes themselves. Designs which isolate the brushes from impact as a result of the tool being dropped or otherwise subjected to abuse is a desirable goal.

SUMMARY OF THE INVENTION

The preferred embodiments of the present invention provide an integrated brush-holder system that permits brushes to be easily installed and replaced in a motor without the use of screws, rubber pads, end caps or the like. The brushes are also isolated from the end cap and therefore are relatively insulated from any impact that may be applied to the end cap. This isolation prevents the force of an impact from being transferred from the end cap into the brush-holders and the brushes themselves.

The preferred embodiment of the present invention has a brush-holder that is configured to accept a brush therein, the replacement of which is easily accomplished without any special tools. The brush-holder can be assembled into the motor by simple insertion of it into a pocket structure and the brush-holder interacts with the pocket structure to firmly hold the brush-holder. The brushes as well as the brush-holder itself can be easily removed without special tools, which facilitates replacement of either the brush-holder or the brushes themselves. Construction features in the motor housing interact with the construction of the brush-holder so that the brush-holder will be accurately located when it is inserted in the motor housing. Additionally, brushes can be replaced without removing the associated brush-holder if desired.

DESCRIPTION OF THE PREFERRED EMBODIMENT

The preferred embodiment of the integrated brush-holder system of the present invention comprises a motor housing which is configured to receive at least one and preferably a pair of brush-holders wherein each of the brush-holders includes a motor brush therein. The brush-holders are preferably positioned to diametrically oppose one another on opposite sides of a commutator of an electric motor.

Figure 1:
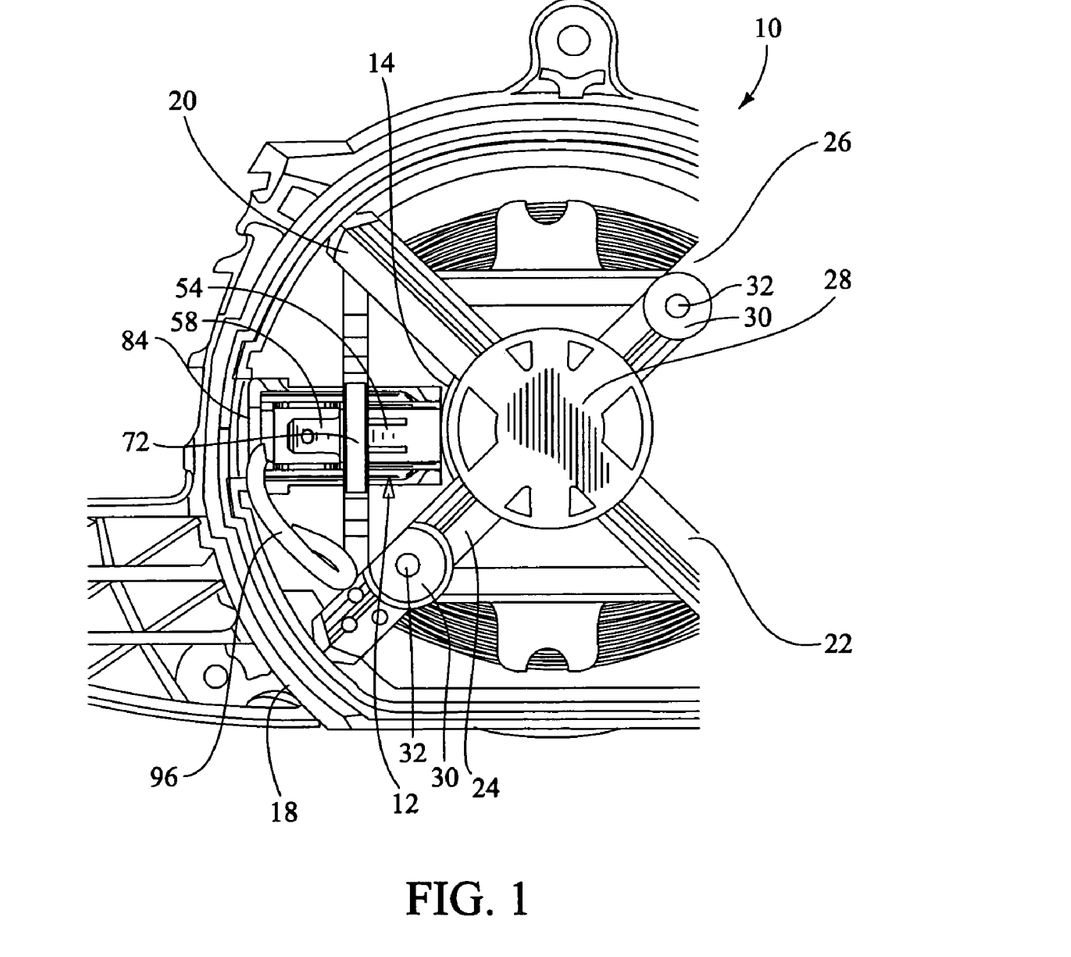
FIG. 1 is a top view of a substantial portion of a motor housing together with motor components and a brush-holder.
Figure 2:
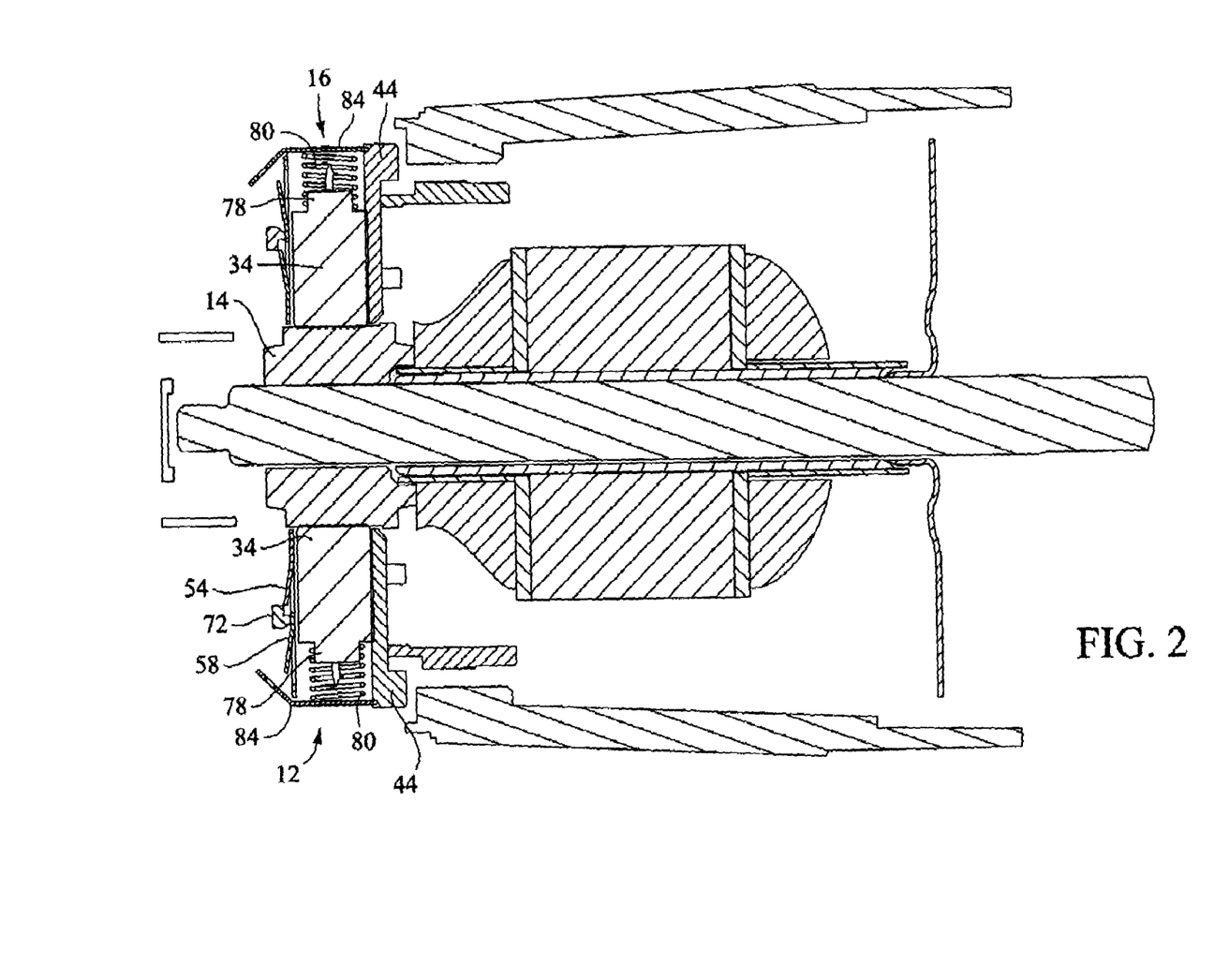
FIG. 2 is a simplified diagrammatic cross-section taken generally through the axis of a motor having a pair of brush-holders according to the preferred embodiment of the present invention.
Figure 3:
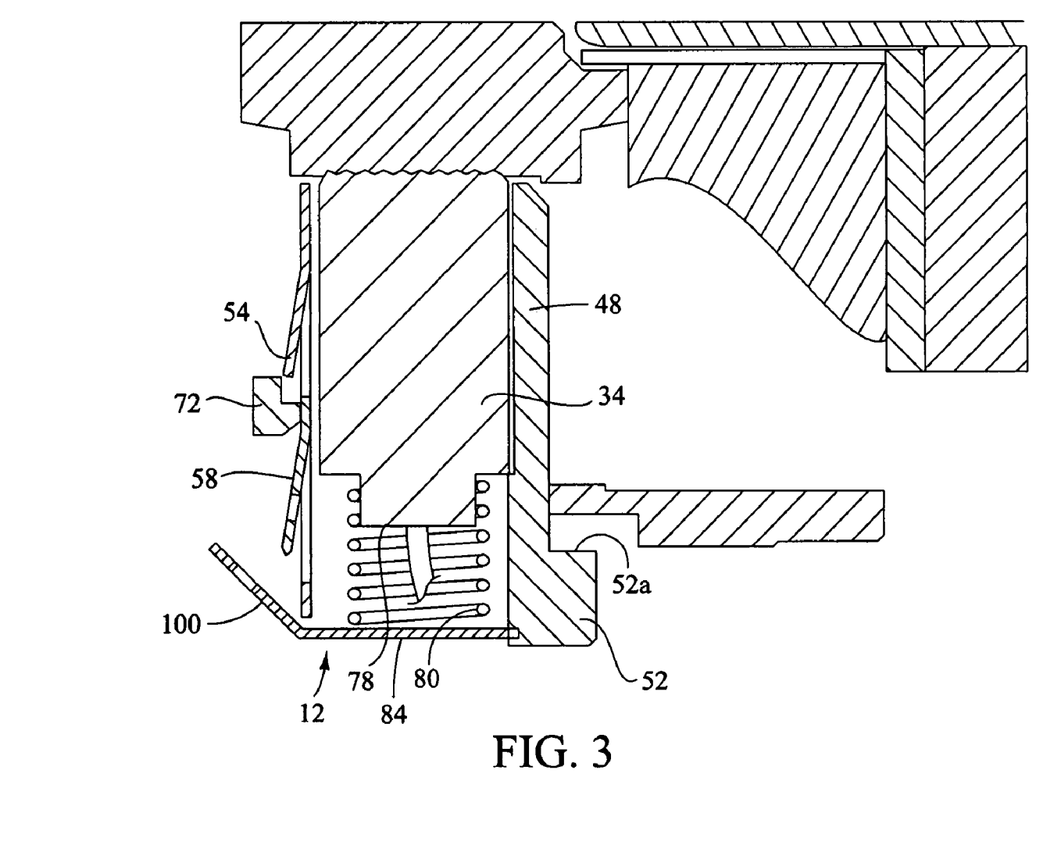
FIG. 3 is an enlarged illustration of a portion of the preferred embodiment shown in FIG. 2.
Figure 4:
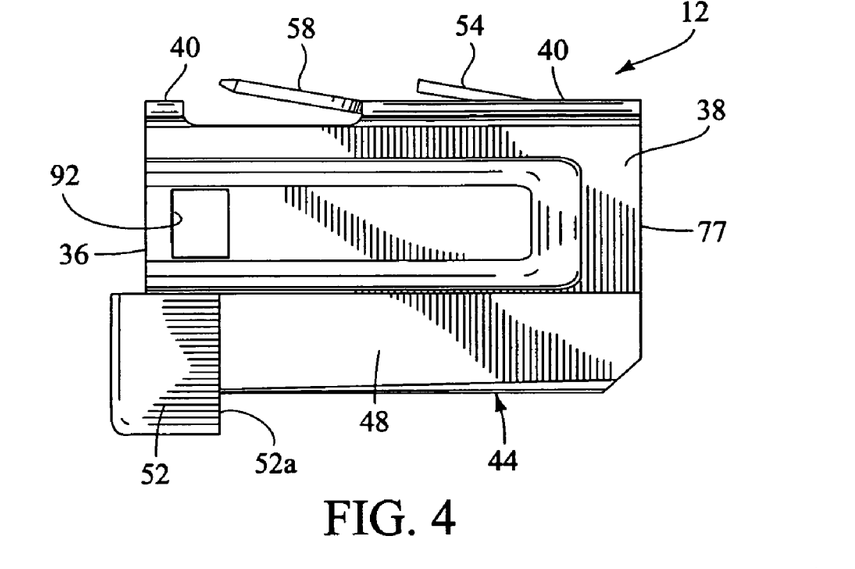
FIG. 4 is a side view of the brush-holder shown in FIG. 3.
Figure 5:
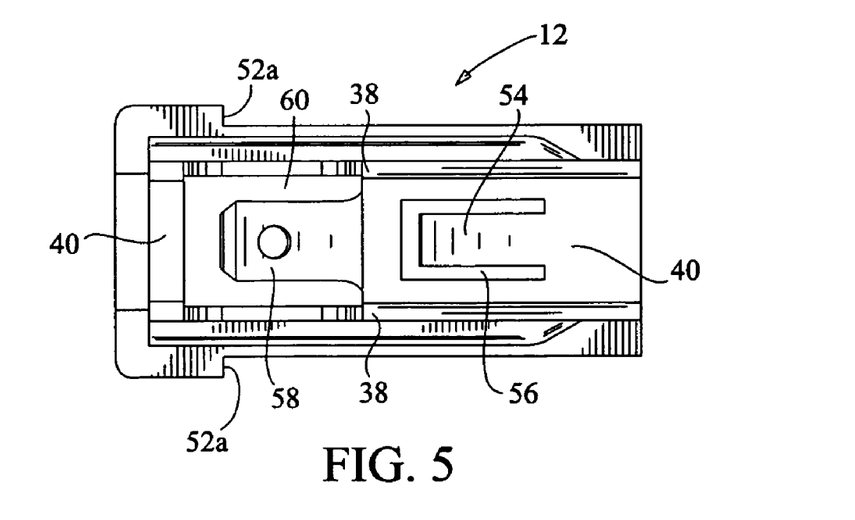
FIG. 5 is a top view of the brush-holder shown in FIGS. 3 and 4.
Figure 6:
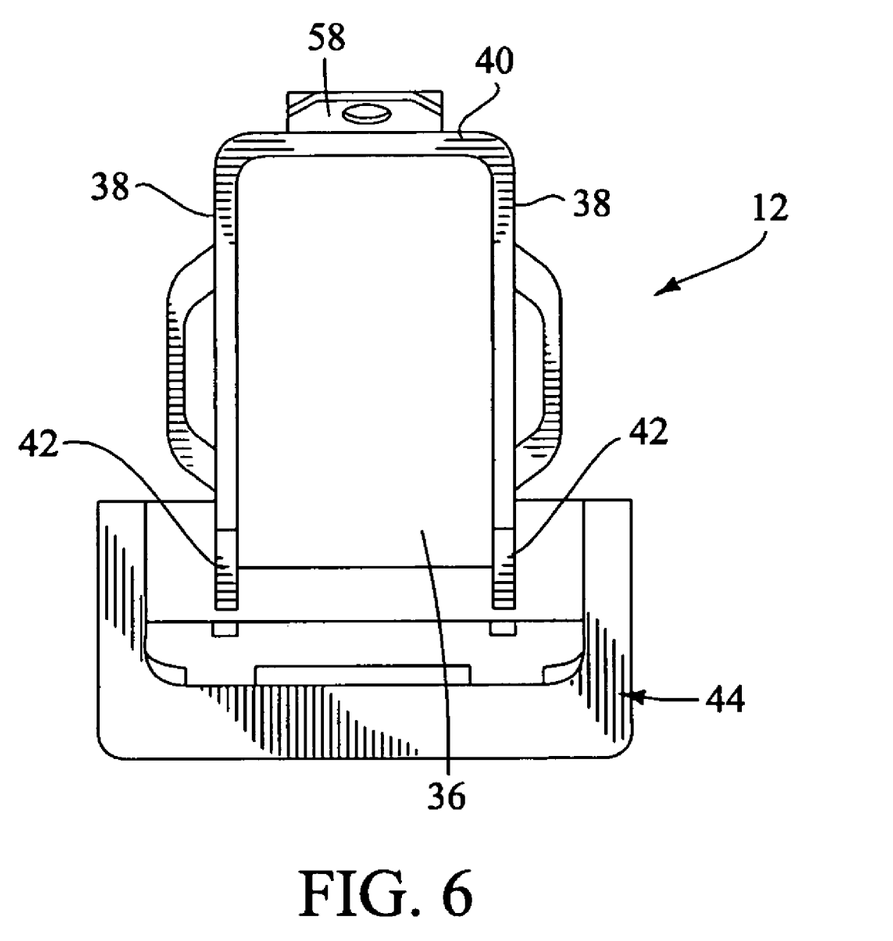
FIG. 6 is an end view of the brush holder shown in FIG. 3
Figure 7:
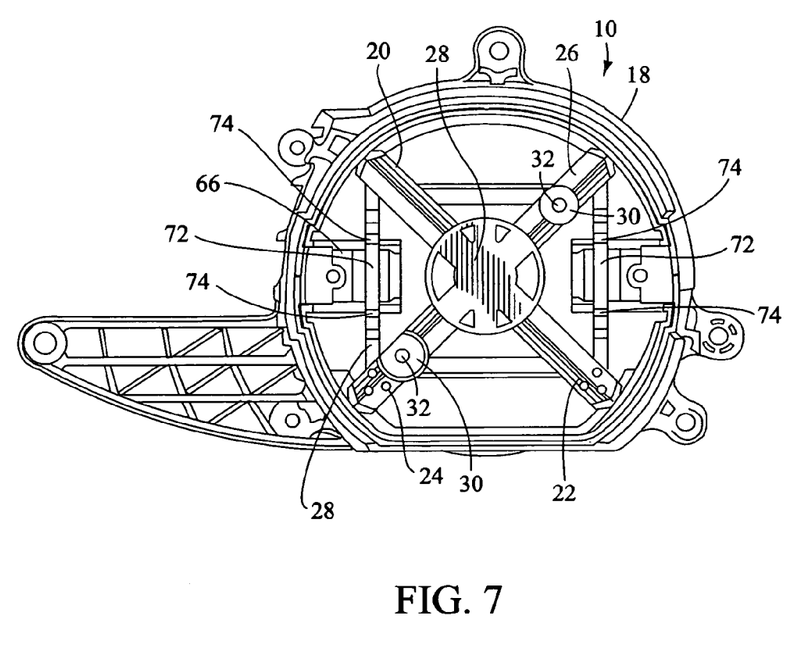
FIG. 7 is a top view of the motor housing of the preferred embodiment of the present invention.
Figure 8:
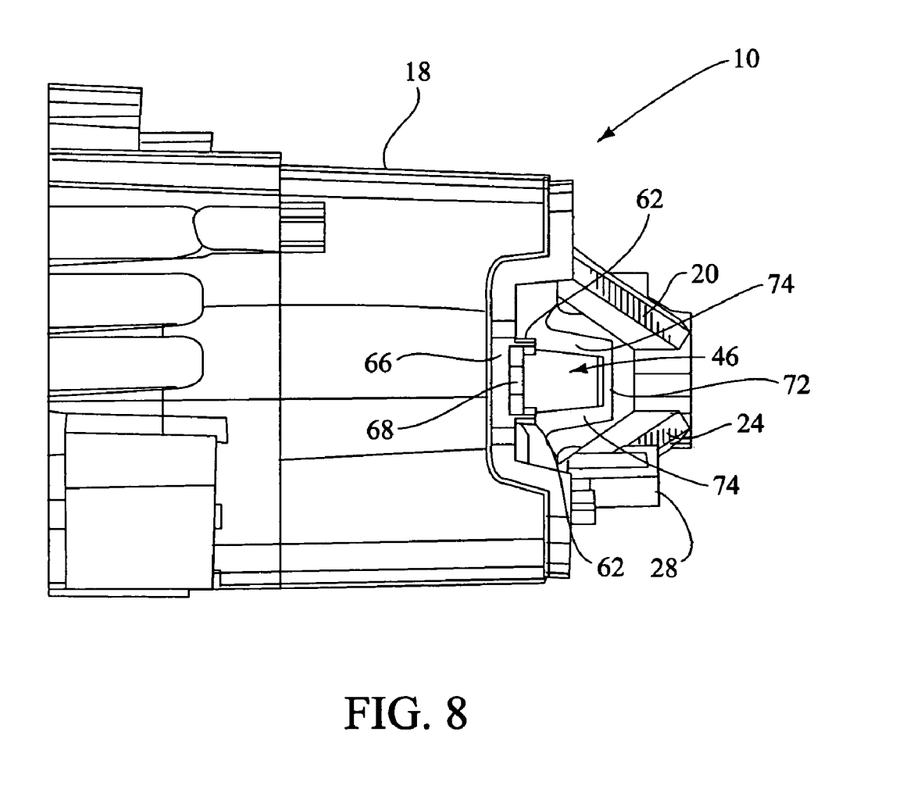
FIG. 8 is a side view of the motor housing of the present embodiment.

Turning now to the drawings, FIG. 1 illustrates a perspective view of a portion of a motor housing, indicated generally at 10, in which a brush-holder, indicated generally at 12, is illustrated, with the brush-holder 12 having a brush assembly therein. While FIG. 1 illustrates a single brush assembly 12, it should be understood that a second brush-holder assembly is provided and would be on the opposite side of a commutator 14 shown in FIG. 1, the second brush-holder being illustrated at 16 in FIG. 2.

Returning to FIG. 1, the motor housing 10 has a generally cylindrical outer portion 18 from which four structural frame members 20, 22, 24, and 26 extend upwardly at an angle to a generally flat circular end 28 that provides an outer structure in which a motor is located. The members 24 and 26 include a pair of flat bosses 30, each of which has a threaded bore 32 therein in which screws (not shown) in an end plate (not shown) can be inserted for installing an end plate of the motor housing 10. It should be appreciated that the brush-holders 12, 16 are not directly connected to the end plate and therefore should not be damaged if the end plate itself is struck, as might occur if the tool in which the preferred embodiment is installed is dropped or otherwise abused.

Referring now to FIGS. 3, 4, 5 and 6, the brush-holder 12 is a generally rectangular structure configured to receive a generally rectangular brush 34 at a receiving end 36 of the brush-holder. Side walls 38 depend downwardly from a top portion 40, with downwardly extending legs 42 being received within a bottom structure 44. The bottom structure 44 is preferably composed of an electrically insulating material, such as bakelite for example, and the downwardly extending legs 42 are preferably located in place before the bottom structure 44 is formed. Unlike the bottom structure 44, the balance of the brush-holder 12 is preferably composed of an electrically conductive metal material.

Figure 9:
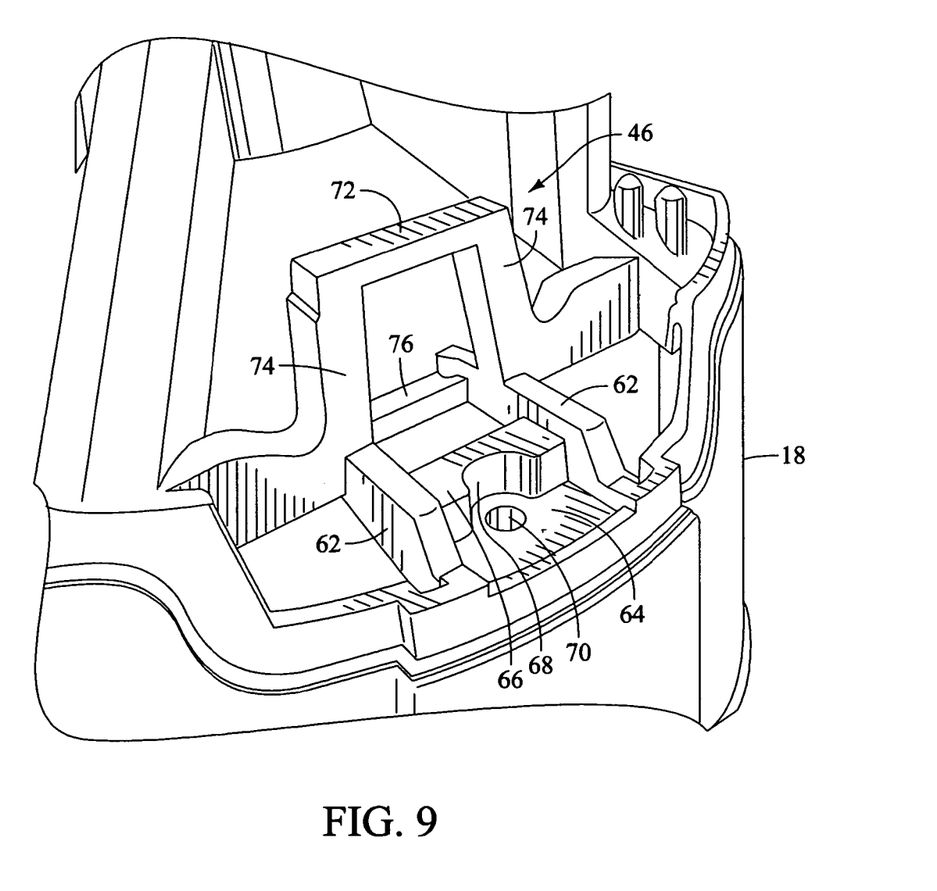
FIG. 9 is a perspective view of a portion of the motor housing illustrating the brush-holder pocket of the motor housing in which the brush-holder and brushes are assembled.

The brush-holder 12 further preferably includes features to promote a snug mating engagement within a brush-holder pocket, the brush-holder pocket being indicated generally at 46 in FIG. 9. Returning to FIGS. 3–6, the brush-holder bottom structure 44 preferably includes a pair of side rails 48. Preferably, wherein a space between the side rails 48 at an underside of the bottom structure defines a generally rectangular channel (not shown). At an end of the bottom structure 44 toward the receiving end 36 of the brush-holder 12, the bottom structure preferably includes a downwardly depending end flange 52. Thus, a shoulder 52a is formed at the underside of the bottom structure 44 by the end flange 52.

The top portion 40 preferably includes at least one locking tab 54, which is a generally thin rectangular shaped structure that is biased to extend at least slightly upwardly from the top portion, and is bound on three sides by a generally U-shaped recess 56. Additionally, a contact tab to assure continued operation until the brush is sufficiently worn that it needs to be replaced. is also preferably provided on the top portion 40 that is also configured to be biased at least slightly upwardly, and is bound on three sides by a generally U-shaped recess 60. The contact tab 58 may optionally be provided to complete electrical connection with the motor or another electronically controlled device, such as a speed control device or other terminal.

Correspondingly, as shown in FIG. 9, the brush-holder pocket 46 is defined at its sides by side walls 62 that extend radially inwardly from a circumference of the cylindrical outer portion 18 of the motor housing 10. A bottom surface 64 of the brush-holder pocket 46 spans the side walls 62 along at least a portion of the length of the side walls, and is defined at an inner edge by a raised shelf 66 having an arcuate recess 68 disposed therein. A generally circular orifice 70 is disposed within the bottom surface 64 adjacent the raised shelf 66. A bridge 72 is disposed at a predetermined distance above the bottom surface 64 supported by side portions 74 that extend upwardly from the side walls 62 to the bridge. A rear support 76 is also preferably provided at an inner portion of the brush-holder pocket 46, wherein the rear support is coplanar with but separate from the bottom surface 64 of the brush-holder pocket.

Thus, the brush-holder 12 is generally sized and configured to matingly receive the brush 34, while also being sized and configured to be matingly received within the brush-holder pocket 46 disposed within the housing 10. The brush-holder 12 is preferably inserted into the brush-holder pocket 46, with a commutator end 77 of the brush-holder, which is the end opposite the receiving end 36, leading entry into the brush-holder pocket. A height of the bridge 72 is configured such that an underside of the bridge slidably engages the top portion 40, while the underside of the bottom structure 44 slidably engages the bottom surface 64 of the brush-holder pocket 46. As the brush-holder 12 continues to slide within the brush-holder pocket 46, resistance is encountered by the locking tab 54 exerting an upward force on the bridge 72, and since the bridge is fixed, the bridge in turn compresses the locking tab downwardly. Additionally, further movement is prevented when the end shoulder 52a is brought into abutment with the raised shelf 66, at which position the bridge 72 is generally in abutment with an end of the locking tab 54. The rear support 76 preferably supports the commutator end 77 at the underside of the bottom structure 44.

Figure 10:
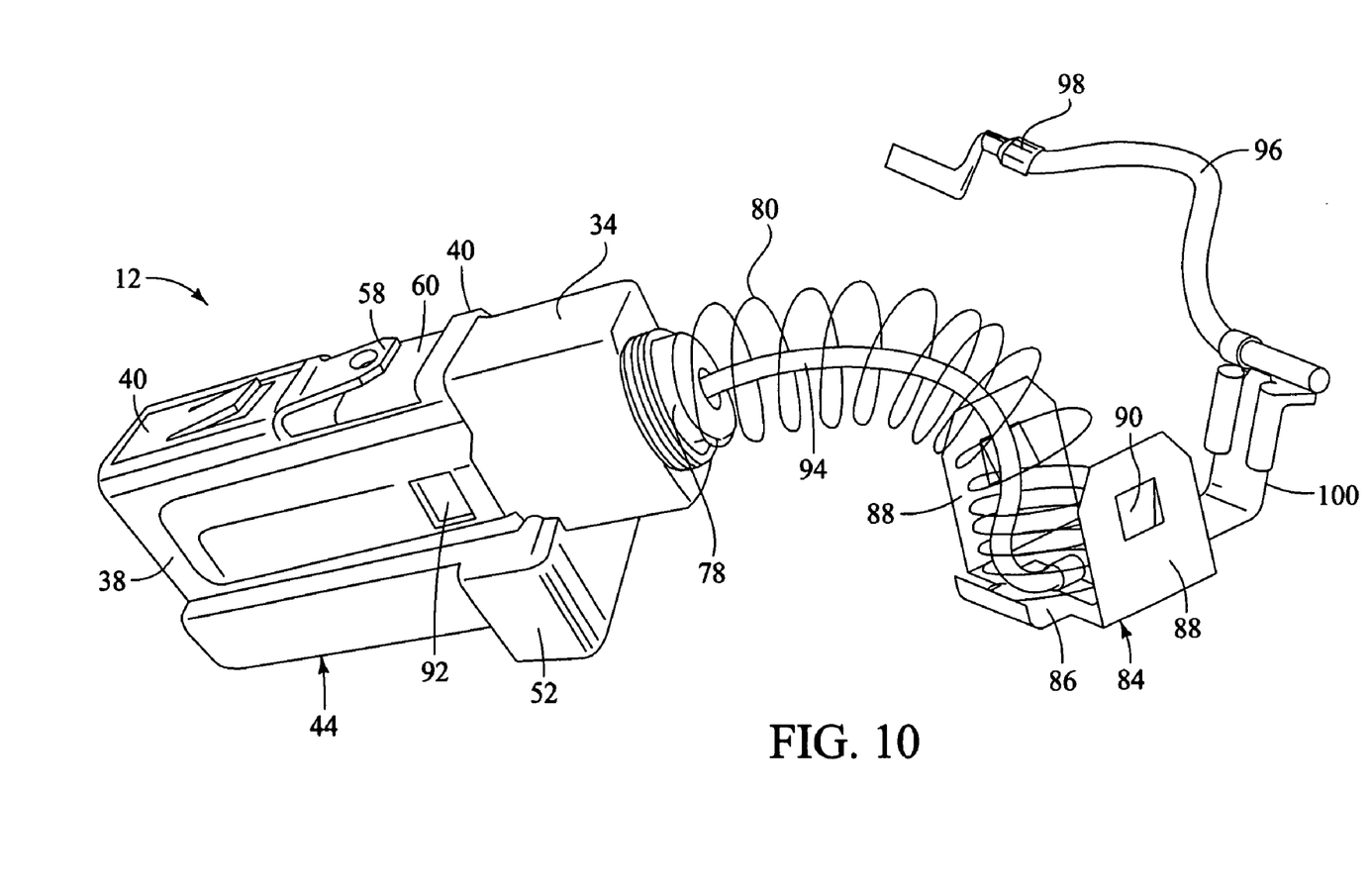
FIG. 10 is a perspective view of portion of a brush-holder shown together with a brush assembly according to the preferred embodiment of the present invention.
Figure 11:
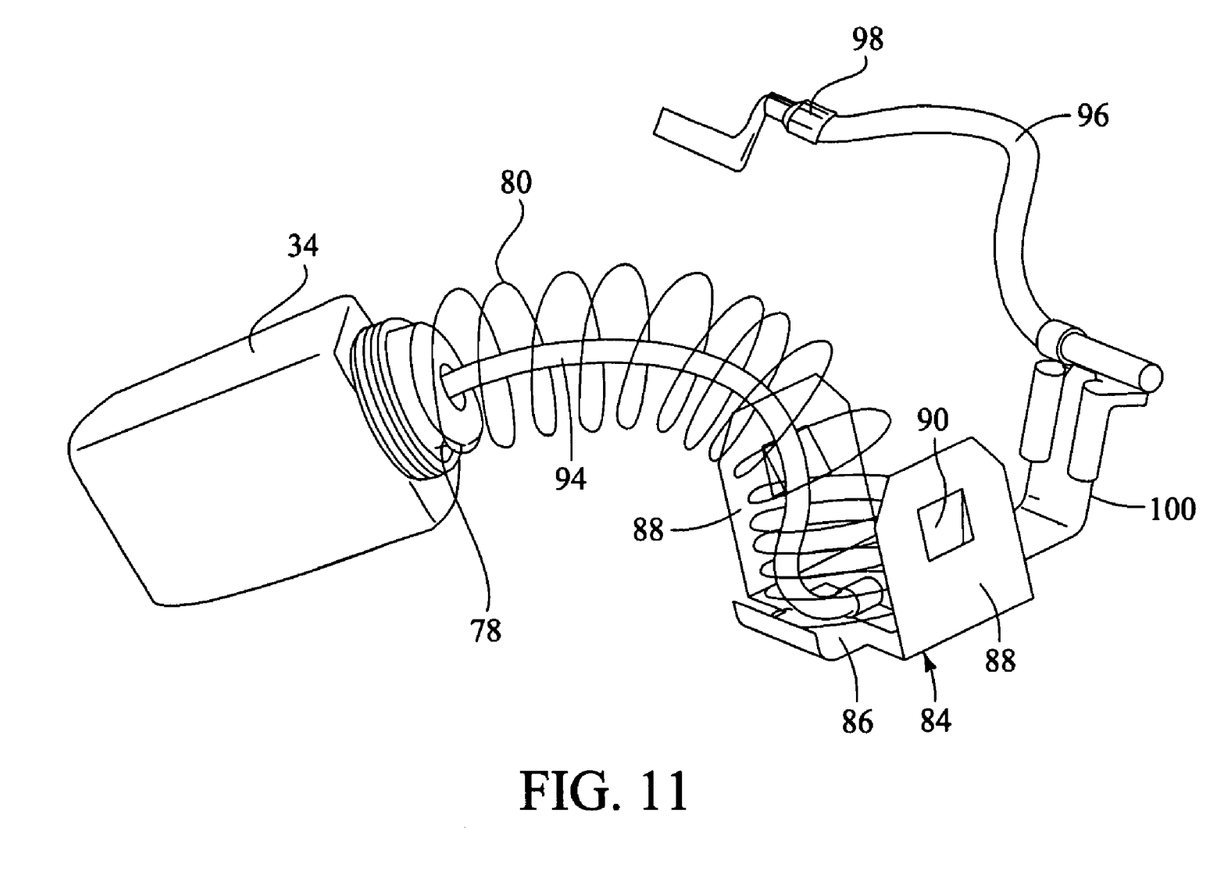
FIG. 11 is a perspective view of portion of a brush assembly according to the preferred embodiment of the present invention.

As shown in FIG. 10, the exemplary brush 34 described in conjunction with the invention is an elongated brush having a rectangular cross-section that is only slightly smaller than a cross-section of the generally rectangular brush-holder 12. An end of the brush 34 that is inserted into the brush-holder 12 includes a circular cylindrical protrusion 78 on which a biasing element, preferably a compression spring 80, is coupled and which extends toward the receiving end 36 of the brush-holder 12. To maintain the contact of the compression spring 80 to the brush 34, the invention may further include an end piece 84 that is sized and configured to engage the receiving end 36 of the brush-holder 12 (best shown in FIG. 4).

Specifically, the end piece 84 is preferably a rectangular plate having a downwardly depending flange 86 that is configured to matingly engage a correspondingly configured portion of the bottom structure 44. Additionally, the end piece 84 preferably includes side locking tabs 88 that extend along at least a portion of the side walls 36 of the brush-holder 12 in a direction that is generally perpendicular to a plane of the end piece 84. Each of the side locking tabs 88 preferably include a locking protrusion 90 that is oriented inwardly toward the side walls 36 of the brush-holder 12. Where the locking protrusion 90 is provided, the side walls 36 include a corresponding locking orifice 92. Thus, as the end piece 84 is coupled to the contact end 82 of the brush-holder 12, the downwardly depending flange 86 engages the bottom structure 44, while the locking protrusions 90 on each of the side locking tabs 88 lockingly engages the respective locking orifice 92 disposed on either side wall 36 of the brush-holder.

When the brush 34 is coupled to the brush-holder 12 therefore, the cylindrical protrusion 78 is matingly engaged to one end of the compression spring 80, while the other end of the compression spring is in abutment with the end piece 84 of the brush-holder. Thus, because the end piece 84 is stationary insofar as it is lockingly engaged to the brush-holder 12, the compression spring 80 biases the brush 34 in the direction of the commutator end 77 of the brush-holder. In this manner, the brush 34 is urged into contact with the commutator 14. Additionally, as the brush 34 wears, the compression spring 80 will decompress, thereby continually urging the brush in the direction of the commutator 14 to assure continued operation until the brush is sufficiently worn that it needs to be replaced.

A preferably copper braided wire 94 is also attached to the brush 34 as well as to the end piece 84, and a preferably insulated wire 96 extends to a connector 98 for electrically and physically connecting the brush to the motor. A conductive tab 100 extends upwardly from a top end of the end piece 84 at an angle toward the commutator end 77 (best shown in FIG. 4) of the brush-holder 12. Like the contact tab 58, the conductive tab 100 may optionally be provided to maintain electrical contact with the motor or other electronically controlled device, such as a speed control device or other terminal. While one or the other of the contact tab 58 and conductive tab 100 may be present alone, it is preferred that both are provided in the preferred embodiment to provide at least two electrical connections.

The invention is particularly advantageous in that the brush-holder 12 may be quickly and easily removed from the housing 10, and the brush 34 disposed within the brush-holder may subsequently be quickly and easily removed and replaced. To disengage the brush-holder 12 from the brush-holder pocket 46, the operator depresses the locking tab 54 with a screw driver or other tool while pulling the brush-holder outwardly from the brush-holder pocket. With the locking tab 54 depressed, the brush-holder 12 may be slidably removed from the brush-holder pocket 46.

To remove the brush 34 from the brush-holder 12, the end piece 84 can be removed from the brush-holder 12 by simply inserting a screwdriver (or other tool) between the side walls 38 and the side locking tabs 88 of the end piece. Thus, the end piece 84 and brush-holder 12 can be easily separated from one another, which enables the brushes to be easily replaced. In the preferred embodiment illustrated, the end piece 84 includes the conductive tab 10 in which the insulated wire 96 may be attached, preferably by soldering, although the attachment may be made by crimping or the like. Similarly, the insulated wire 96 is either crimped or soldered to the end piece 84. The composition of the brushes is conventional and is well known to those of ordinary skill in the art.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A brush-holder system for an electric motor which is the type which has a rotating commutator that is journaled in a first motor housing portion, said assembly comprising:
   a second motor housing portion configured to be matingly connected to the first motor housing portion and having at least one brush holding pocket therein, said pocket being formed by a structure of said second motor housing portion which defines a support surface on one side thereof and a bridge portion on an opposite side thereof;
   an elongated brush having first and second ends, wherein said first end is configured to be coupled to a biasing member and said second end is configured to contact the motor commutator;
   at least one removable brush-holder having a first open end configured to receive said brush therein and to fit in said pocket, a second open end enabling said brush to extend outwardly therefrom to contact the motor commutator, and a deflectable first locking tab extending upwardly from a top surface thereof for engaging said bridge portion of said second motor housing portion, said first locking tab being easily accessible for manipulation to remove said brush-holder from said second motor housing portion;
   a biasing member coupled to said brush; and
   removable end cap coupled to the first open end of said brush-holder and configured to be in abutment with said biasing member to bias the brush toward the motor commutator.

2. The brush-holder system of claim 1 further comprising two removable brush-holders, each of said removable brush-holders being configured to receive a brush therein.

3. The brush-holder system of claim 1 wherein said first end portion of said brush further is configured to be cylindrical.

4. The brush-holder system of claim 1 wherein said second housing portion comprises an electrically insulating material.

5. The brush-holder system of claim 1 wherein said at least one brush-holder further comprises an insulating base portion.

6. The brush-holder system of claim 5 wherein said insulating base portion includes a pair of shoulders to limit movement of the brush-holder during insertion.

7. The brush-holder system of claim 1 wherein said biasing member comprises a compression spring interposed between said end cap and said first end portion for biasing said brush toward the commutator.

8. The brush-holder system of claim 3 wherein said biasing member is coupled to said cylindrical end portion.

9. The brush-holder system of claim 1 wherein said end cap further comprises second deflectable locking tabs that engage apertures in said brush-holder for releasably holding said end cap to said brush-holder.

10. The brush-holder system of claim 9 wherein said brush-holder further comprises an electrical connecting tab that extends upwardly for providing an electrical connection to the motor.

11. A removable brush assembly for an electric motor having a generally cylindrical motor commutator, a motor housing having structure defining at least one brush assembly holding pocket and a bridge portion spanning each pocket, said brush assembly comprising:
   an elongated brush having first and second ends, wherein said first end is configured to be coupled to a biasing member and said second end is configured to contact the motor commutator;
   a removable brush-holder having a first open end configured to receive said brush therein and to fit in the pocket, a second open end enabling said brush to contact the motor commutator, and a deflectable first locking tab extending upwardly from a top surface thereof for engaging said bridge portion of said second motor housing portion, said first locking tab being easily accessible for manipulation to remove said brush-holder from said second motor housing portion;
   a biasing member coupled to said brush; and
   removable end cap coupled to the first open end and configured to be in abutment with said biasing member to bias the brush toward the motor commutator.

12. The removable brush assembly of claim 11 wherein said first end of said brush is configured to include a cylindrical portion.

13. The removable brush assembly of claim 11 wherein said brush-holder further comprises an insulating base.

14. The removable brush assembly of claim 11 wherein a structure defining an opening of the brush assembly holding pocket and the bridge portion comprise electrically insulating material.

* * * * *